(12) United States Patent
Balfanz et al.

(10) Patent No.: US 7,392,387 B2
(45) Date of Patent: *Jun. 24, 2008

(54) APPARATUS AND METHODS FOR PROVIDING SECURED COMMUNICATION

(75) Inventors: Dirk Balfanz, Menlo Park, CA (US); Diana Smetters, San Francisco, CA (US); Paul Stewart, Sunnyvale, CA (US); Daniel C. Swinehart, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/679,166

(22) Filed: Feb. 26, 2007

(65) Prior Publication Data

US 2007/0204149 A1    Aug. 30, 2007

Related U.S. Application Data

(63) Continuation of application No. 10/231,194, filed on Aug. 30, 2002, now Pat. No. 7,185,199.

(51) Int. Cl.
*H04L 9/00* (2006.01)
(52) U.S. Cl. .................. 713/168; 713/158; 713/163; 726/4; 726/26; 726/29; 705/64; 380/277; 380/284
(58) Field of Classification Search ............... 713/158, 713/153, 168; 380/277, 284; 726/4, 26, 726/29; 705/64
See application file for complete search history.

(56) References Cited

U.S. PATENT DOCUMENTS

| | | | |
|---|---|---|---|
| 5,341,426 A | 8/1994 | Barney et al. | |
| 5,408,250 A | 4/1995 | Bier | |
| 5,519,778 A | 5/1996 | Leighton et al. | |
| 5,539,824 A | 7/1996 | Bjorklund et al. | |
| 6,035,398 A * | 3/2000 | Bjorn | ......................... 713/186 |
| 6,064,741 A | 5/2000 | Horn et al. | |
| 6,075,860 A | 6/2000 | Ketcham | |
| 6,105,133 A | 8/2000 | Fielder et al. | |
| 6,215,878 B1 * | 4/2001 | Harkins | ..................... 380/281 |
| 6,243,373 B1 | 6/2001 | Turock | |
| 6,243,772 B1 | 6/2001 | Ghori et al. | |

(Continued)

FOREIGN PATENT DOCUMENTS

EP    1024626 A1    1/1999

(Continued)

OTHER PUBLICATIONS

"ACC: Automatic Cryptographic Configuration of Embedded Devices" XML Trust Center White Paper 19th Feb. 2002, http://research.verisign.com/Papers/ACC1.html.

(Continued)

*Primary Examiner*—Benjamin E. Lanier
*Assistant Examiner*—Abdulhakim Nobahar
(74) *Attorney, Agent, or Firm*—Park, Vaughan & Fleming LLP

(57) ABSTRACT

Authentication information is generated for a group where members within a group are able to communicate with each other, but a non-members is not able to participate in that communication. The authentication information provides the determination of whether the member belongs to the group.

19 Claims, 9 Drawing Sheets

U.S. PATENT DOCUMENTS

| | | | |
|---|---|---|---|
| 6,256,737 | B1 | 7/2001 | Bianco et al. |
| 6,366,654 | B1 | 4/2002 | Cramer et al. |
| 6,584,566 | B1 * | 6/2003 | Hardjono .................... 713/163 |
| 7,013,389 | B1 | 3/2006 | Srivastava et al. |
| 7,027,836 | B2 | 4/2006 | Zacks et al. |
| 2001/0048744 | A1 | 12/2001 | Kimura |
| 2002/0022483 | A1 | 2/2002 | Thompson et al. |
| 2002/0061748 | A1 | 5/2002 | Nakakita et al. |
| 2002/0065065 | A1 | 5/2002 | Lunsford et al. |
| 2002/0094087 | A1 | 7/2002 | Dellmo et al. |
| 2002/0147920 | A1 | 10/2002 | Mauro |
| 2002/0159598 | A1 | 10/2002 | Rubenstein et al. |
| 2002/0176579 | A1 | 11/2002 | Deshpande et al. |
| 2003/0014646 | A1 | 1/2003 | Buddhikot et al. |
| 2003/0051140 | A1 | 3/2003 | Buddhikot et al. |
| 2003/0056093 | A1 | 3/2003 | Huitema et al. |
| 2003/0078072 | A1 | 4/2003 | Serceki et al. |
| 2003/0081774 | A1 | 5/2003 | Lin et al. |
| 2003/0095663 | A1 | 5/2003 | Nelson et al. |
| 2003/0117985 | A1 | 6/2003 | Fujii et al. |
| 2003/0126464 | A1 * | 7/2003 | McDaniel et al. ........... 713/201 |
| 2003/0145200 | A1 | 7/2003 | Eden |
| 2003/0149874 | A1 | 8/2003 | Balfanz et al. |
| 2004/0030887 | A1 | 2/2004 | Harrisville-Wolff et al. |
| 2004/0088548 | A1 | 5/2004 | Smetters et al. |
| 2004/0103280 | A1 | 5/2004 | Balfanz et al. |
| 2004/0215974 | A1 | 10/2004 | Conley et al. |
| 2004/0266449 | A1 | 12/2004 | Smetters et al. |
| 2004/0268119 | A1 | 12/2004 | Smetters et al. |

FOREIGN PATENT DOCUMENTS

| | | |
|---|---|---|
| EP | 1 102 430 A1 | 5/2001 |
| EP | 1 229 442 A2 | 8/2002 |
| EP | 1 395 019 A3 | 12/2004 |
| WO | WO 99/41876 | 8/1999 |
| WO | WO 02/063847 A2 | 8/2002 |

OTHER PUBLICATIONS

Asokan, N. et al.: "Key agreement in ad hoc networks", Computer Communications, Elsevier Science Publishers BV, Amsterdam, NL, vol. 23, No. 17, Nov. 1, 2000, pp. 1627-1637.

Balfanz, D. et al., "Talking To Strangers: Authentication in Ad-Hoc Wireless Networks," Xerox Palo Alto Research Center, http://www.isoc.org/isoc/conferences/ndss/02/proceedings/papers/balfan.pdf, Feb. 18, 2003 (Posted on the Internet on Feb. 11, 2002).

Bardram, Jakob E. et al. "Context-Aware User Authentication-Supporting Proximity-Based Login in Pervasive Computing", A.K. Dey et al. (Eds.): UbiComp 2003, LNCS 2864, pp. 107-123, 2003.

Dridi, F.et al., "How to Implement Web-Based Groupware Systems Based on WebDAV," Published in Proc. of WETICE 99, IEEE 8th Intl. Workshops on Enabling Technologies: Infrastructure for Collaborative Enterprises, Stanford, CA, pp. 1-7 (1999).

Fielding, R. et al., "Web-Based Development of Complex Information Products," Communications of the ACM, vol. 41, No. 8, pp. 84-92 (1998).

Geer, Daniel E. et al. "Token-Mediated Certification and Electronic Commerce", Proceedings of the Second USENIX Workshop on Electronic Commerce, Oakland, California, Nov. 1996.

Kindberg, Tim and Zhang, Kan "Validating and Securing Spontaneous Associations between Wireless Devices" HP Laboratories, Palo Alto, HPL-2002-256, Hewlett-Packard Company, Sep. 12, 2002.

Kindberg, Tim and Zhang, Kan "Secure Spontaneous Device Association", A.K. Dey et al. (Eds.): UbiComp 2003, LNCS 2864, pp. 124-131, 2003.

Harney, H. et al., "Group Key Management Protocol (GKMP) Architecture," RFC 2094, pp. 1-22, Jul. 1997.

Lopes, D. et al., "Aerial Acoustic Communication," IEEE Workshop on Applications of Signal Processing to Audio and Acoustics, pp. 21-24, (2001).

Netscape Inc., "Netscape Certificate Management System Installation and Deployment Guide: Introduction to Certificate," Internet Citation, XP002271674, pp. 1-35, 2000.

Schneier, Bruce: "Applied Cryptography: Protocols, Algorithms, and Source Code in C" 1996, John Wiley & Sons, New York, US, Section 8.3 "Transferring Keys".

Stajano, F. and Anderson, R.: "The Resurrecting Duckling: Security Issues for Ad-hoc Wireless Networks" 1999, AT&T Software Symposium, 'Online!' Sep. 15, 1999.

Whitehead, Jr., E. et al., "WebDAV, A Network Protocol for Remote Collaborative Authoring on the Web," pp. 1-21 (1999) http://citeseer.nj.nec.com/whitehead99webdav.html, Mar. 11, 2003.

Whitehead, Jr., E. et al., "Lessons from WebDAV for the Next Generation Web Infrastructure," Department of Information and Computer Science, University of California http://www.ics.uci.edu/~ejw/http-future/Whitehead/http_pos_paper.html, Sep. 20, 2002.

U.S. Appl. No. 60/480,909, by Smetters et al., entitled "Method and apparatus for establishing and using a secure credential infrastructure", filed Jun. 24, 2003.

* cited by examiner

US 7,392,387 B2

APPARATUS AND METHODS FOR PROVIDING SECURED COMMUNICATION

This application is a continuation application of U.S. patent application Ser. No. 10/231,194, filed Aug. 30, 2002, now U.S. Pat. No. 7,185,199 by the same inventors, claims priority therefrom and incorporates its entire disclosure herein by reference.

BACKGROUND OF THE INVENTION

1. Field of Invention

This invention relates to apparatus and methods for securing communication in a network medium.

2. Description of Related Art

Arbitrary connections can be used to connect various devices, such as Personal Digital Assistants (PDAs), handheld computers, laptop computers, desktop computers, cellular phones, wireless phones, sensors with measuring devices, securing devices, and home entertainment, automation, and security devices, for example. However, authorizing communication between certain devices while disallowing others may require an infrastructure that provides globally trusted certification authorities, up-to-date certificate revocation lists, and sound certificate issuing policies.

These elaborate systems for securing wireless and hardwired communication are not well suited to environments where ease of use and accessibility are important. For example, in an environment where users are likely to be unsophisticated or are unwilling to deal with the challenges of security configurations, security may be breached because the users may not know how to use the security measures. Users may even deliberately turn off the security measures if they find the security measures to be confusing or to be interfering with the tasks that they are attempting to complete.

SUMMARY OF THE INVENTION

This invention provides devices, systems and methods for securing a communication over a communication medium.

This invention separately provides devices, systems and methods that allow communication to be secured among a plurality of members of a group.

In various exemplary embodiments of the devices, systems and methods according to this invention, a securing device includes a logic unit that generates authentication information for a group. In various exemplary embodiments, the securing device includes a location-limited channel transmitter that is usable to send pre-authentication information to a potential member. In various exemplary embodiments, the receipt of the authenticating information by the potential member designates that potential member as a member of the group. In various exemplary embodiments, the member of the group uses the authentication information to secure communication with other members of the group.

In various exemplary embodiments, the securing device generates a trusted group and designates a controller device as a member of the trusted group.

In various exemplary embodiments, the securing device includes a controller device interface to interface with the controller device. In various exemplary embodiments, the controller device interface is adapted to communicate with another device through the communication medium.

In various exemplary embodiments, the securing device includes a biometric input. In various exemplary embodiments, the biometric input is used to generate authentication information. In various exemplary embodiments, the biometric input is used to secure data in a memory of the securing device. In various exemplary embodiments, the biometric input authenticates the user that is allowed to use the securing device.

In various exemplary embodiments, the securing device includes a reset application stored in a memory, where the logic unit uses the reset application to generate a reset signal that resets members of a group to their original state. In various exemplary embodiments, a member device is provided with a reset button, which when activated, reverts the member device to its original state. In various exemplary embodiments, a member device is provided with a reset application, which when executed, reverts the member device to its original state.

In various exemplary embodiments, the securing device includes a logic unit that generates audit information.

These and other features and advantages of the invention are described in, or are apparent from, the following description of various exemplary embodiments of the systems and methods according to this invention.

BRIEF DESCRIPTION OF THE DRAWINGS

Various exemplary embodiments of the invention are described in detail, with reference to the following figures, wherein.

DETAILED DESCRIPTION OF EXEMPLARY EMBODIMENTS

In various exemplary embodiments of devices, systems and methods according to this invention, users can create one or more groups having members, where the members within a group are able to communicate with each other, but a nonmember is not able to participate in that communication. According to various exemplary embodiments, communication between group members is authenticated and/or encrypted. The authentication provides the determination of whether the member belongs to the group. The group can have numerous members or the group can even have only one member. For example, the group can have only one device to which other devices may later be added or the group may have only one device to which a particular key/certificate/credential to a set of applications or services are attached.

Figure 1:
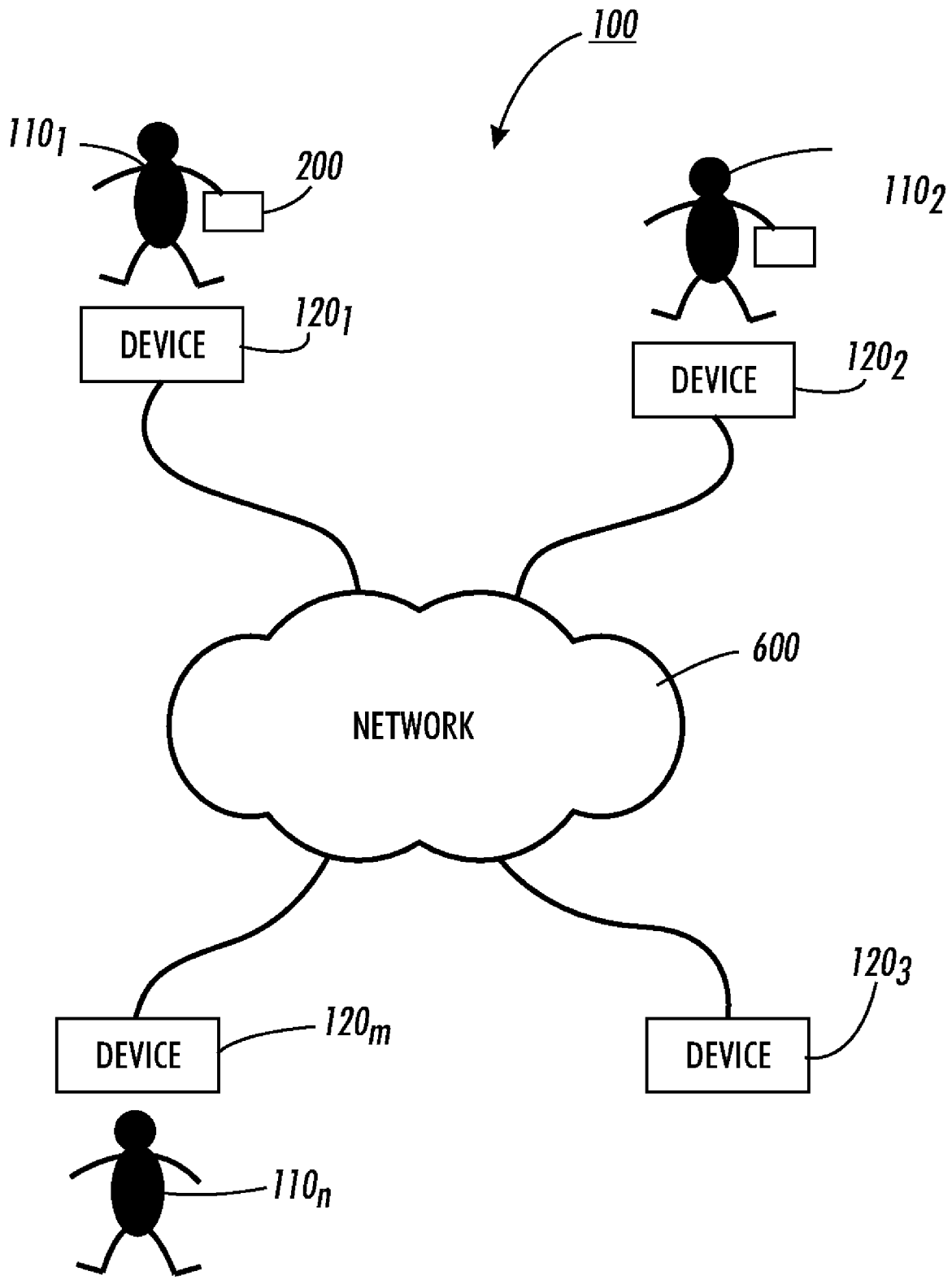
FIG. 1 is a schematic that illustrates one exemplary embodiment of a communication securing system according to this invention.

FIG. 1 illustrates one exemplary system 100 according to the invention where several users $110_1 \ldots 110_n$ and devices $120_1 \ldots 120_m$, such as laptop computers, terminals, telephones, cellular telephones, PDAs, pagers, or any present or future developed wired and/or wireless devices capable of transmitting and/or receiving data communication are connected together through a network 600 which may be wired, wireless or a combination of wired and wireless links. Certain devices such as device $120_3$ do not need human operators. The network 600 may be the Internet, an intranet, a local area network (LAN), a wide area network (WAN), a telecommunication network, a telephone network, a cellular communications network, a satellite communications network, any present or future developed network and any combination of one or more of these structures. In the exemplary system 100 shown on FIG. 1, the user $110_1$ possesses a securing device 200 in accordance with the invention to secure communication among one or more of the devices $120_1 \ldots 120_m$ of one or more of the users $110_1 \ldots 110_n$.

Figure 2:
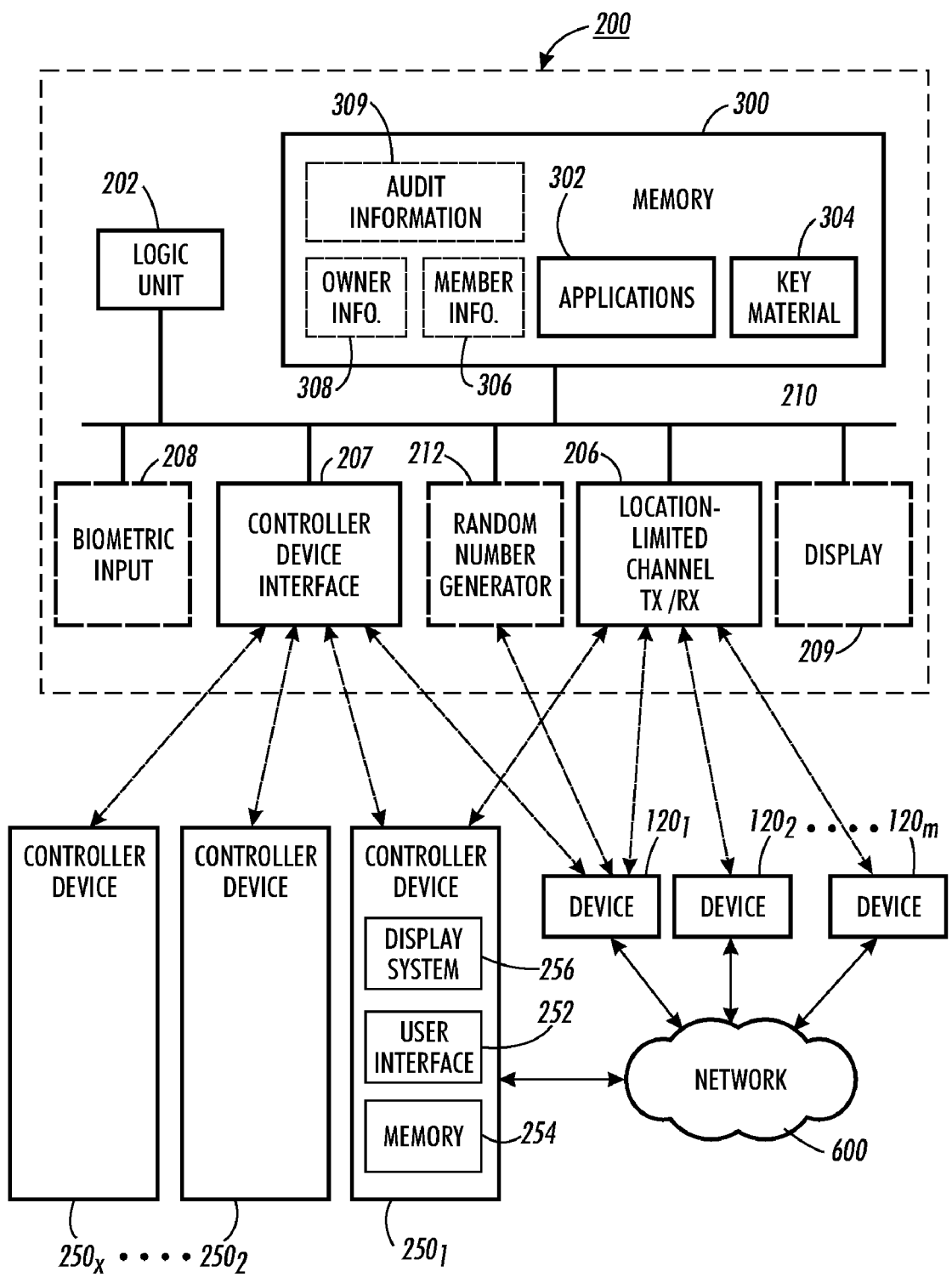
FIG. 2 is a schematic that illustrates one exemplary embodiment of a securing device according to this invention.

FIG. 2 illustrates one exemplary embodiment of the securing device 200 according to the invention. As shown in FIG. 2, the securing device 200 includes one or more logic units 202, a memory 300, a location-limited channel transmitter/receiver 206 and a controller device interface 207 connected together by one or more communication busses 210 and/or application programming interfaces. In various exemplary embodiments, the logic unit 202 is configured to perform cryptographic applications, such as creating and/or storing keys and/or signing certificates, to perform encryption/decryption applications, and/or to run authentication applications, and possibly one or more other desired security tasks using one or more applications 302 that are stored in the memory 300. Some of the cryptographic applications may involve using cryptographic key material 304 stored in the memory 300. The logic unit 202 may further perform applications, such as adding a group member or revoking a group member, and make decision as to how to carry out the desired security operation, for example. In various exemplary embodiments, one of the logic units 202 may be a cryptographic coprocessor that processes complex mathematical operations. In various exemplary embodiments, the securing device 200 may further include a random number generator 212 such as those using a diode or other noise source.

In various exemplary embodiments, the logic unit 202 may be a microprocessor, a microcontroller, a digital signal processor (DSP), an arthmetric logic unit (ALU), an application specific integrated circuit (ASIC) and the like. The memory 300 may be a known or future developed semiconductor volatile and/or non-volatile memory such as random access memory (RAM), read only memory (ROM), flash memory and the like, but may also include known or future developed magnetic or optical disk drive units.

In various exemplary embodiments, the securing device 200 is configured to receive and download applications and/or commands, for example, from an external controller device $250_1$ or the like via the controller device interface 207 and/or the location-limited channel transmitter/receiver 206. The commands can cause the securing device 200 to perform certain tasks while the various applications allow the securing device 200 to execute more sophisticated application logic and/or state control logic. In various exemplary embodiments, the securing device 200 may also independently initiate connections and actions using the location-limited channel transmitter/receiver 206, the controller device interface 207 and/or the capabilities of a controller device $250_1$ in communication with the securing device 200. In various exemplary embodiments, the securing device 200 performs messaging protocols to communicate with other devices $120_1 \ldots 120_m$, to determine what capabilities the other devices $120_1 \ldots 120_m$ have, and/or issue credentials and/or keys that are suitable for the intended purposes of the other devices.

In various exemplary embodiments, the securing device 200 utilizes a number of applications 302 to form a group and to create an infrastructure that allows devices $120_1 \ldots 120_m$ of the group to communicate with each other. Some of the applications 302 may require input from a user beyond that supported by the securing device 200. Other applications 302 may require additional features supported by the controller device $250_1$. In various exemplary embodiments, reducing features on the securing device 200 that may be duplicated by the controller device $250_1$ may also reduce the size of the securing device 200. This reduction may enhance the portability of the securing device 200.

In various exemplary embodiments, the controller device interface 207 and/or the location-limited channel transmitter/receiver 206 may provide the securing device 200 with a communication link that is physically-limited in the distance and/or the direction over which the securing device 200 is able to communicate. In various exemplary embodiments, the communication link may be microwave, infrared, physical contact, wires, USB plugs, serial port connection, parallel port connection, and other known or future developed communication links. In various exemplary embodiments, the communication link may be short-range multi-directional communication such as short-range radio, sound, whether in the audible and/or in the ultrasonic range, Bluetooth and other known or future developed multi-directional communication links.

In various exemplary embodiments, a suitable communication link may depend on the application and/or the environment to be used. As an example, when the communication link between a securing device 200 and a controller device $250_1$ is a short-range radio, sound, contact and so forth, the two devices may need to be in close proximity for the securing device 200 to be in communication with the controller device $250_1$. Thus, if a "stolen" controller device $250_1$ is being used to control the securing device 200, then that controller device $250_1$ will be easily detected because of the close proximity to the securing device 200 in which that controller device $250_1$ must operate. In other examples, the controller device $250_1$ communicates with the securing device 200 over arbitrary distances and/or over arbitrary networks. In these examples, communication links such as infrared, microwave, RFID tags and the like may be used.

In various exemplary embodiments, the arbitrary network may be a wired network, a wireless network, or a combination of the two. In various exemplary embodiments, the arbitrary network may be a local area network, a wide area network, an intranet, an extranet, the Internet, or any other distributed processing and/or storage network.

In various exemplary embodiments, the controller device $250_1$ may be authorized to perform various operations on the securing device 200 at close proximity, but may be authorized to perform certain operations at a remote distance. For example, the controller device $250_1$ may control the operation of the securing device 200 at close proximity, however, it may access the status of the securing device 200 over an arbitrary network. In various exemplary embodiments, the short-range/local communication may allow the possibility of expressing "intention" with location. For example, if the securing device 200 contains subway credits and is close to a turnstile, the turnstile charges the securing device 200 for entry and provides access. However, if the turnstile is a few feet away, the turnstile does not charge the securing device 200.

In various exemplary embodiments, identifying controller devices $250_1 \ldots 250_x$ by their membership in a special trusted group allows a single securing device 200 to be controlled from multiple controller devices $250_1 \ldots 250_x$. The controller devices $250_1 \ldots 250_x$ may be selected by the user of the securing device 200, and can take a variety of forms such as cell phones, PDAs, handheld computers, laptop computers and any other appropriate known and future developed devices that have an appropriate logic unit. In particular, the set of chosen controller devices $250_1 \ldots 250_x$ can vary from user to user. Because the user is usually familiar with the selected controller devices $250_1 \ldots 250_x$, the user need not learn the operation of those controller devices $250_1 \ldots 250_x$ to control the securing device 200. Controlling the securing device 200 may appear to the user as yet another application on the user's controller devices $250_1 \ldots 250_x$. For example, control of the securing device 200 may be performed through a user interface 252 of the controller device $250_1$.

In various exemplary embodiments, the securing device 200 is usually imprinted with the identity of at least one trusted controller device $250_1 \ldots 250_x$ during an initialization process. As part of the initialization process for the securing device 200, the securing device 200 creates a special trusted group in the memory 300 for its trusted controller devices $250_1 \ldots 250_x$ and requests that the user add at least one controller device $250_1 \ldots 250_x$ to this group. The selected controller device $250_1 \ldots 250_x$ is distinguished cryptographically by its membership in a special trusted group, and/or is further distinguished by its ability to run an application that provides for an interface with the securing device 200.

In various exemplary embodiments, having multiple controller $250_1 \ldots 250_x$ help establish trust. For example, a controller device $250_1$ allows a status of the securing device 200 to be displayed on a display screen 256 of the controller device $250_1$. Further, the controller device $250_1$ delivers commands from the user to the securing device 200. If the controller device $250_1$ is tampered with, such tampering is likely to be detected, as a second controller device $250_2$ may be used to verify the status of the securing device 200. Certain controller devices $250_1 \ldots 250_x$, such as a cellular phone, makes it difficult, if not impossible, for an adversary to tamper with the cellular phone's software. In certain embodiments, for high security-sensitive applications, a dedicated tamper-resistant controller device, whose software cannot be changed, may be used to interface with the securing device 200.

In various exemplary embodiments, for added security, the securing device 200 can include a biometric input 208, such as a fingerprint sensor, or any one or more other known or future developed biometric devices. In various embodiments, the biometric input 208 generates biometric identification that can be used to protect sensitive data stored in the securing device 200 and/or as an input analogous to a secure "button." The biometric information can be used to generate keys that are used in group communication and/or to encrypt and/or secure data in the memory 300. The biometric identification can also be used to make the securing device 200 functional for the legitimate user and is rendered useless for anyone else. In various other exemplary embodiments, as an option, the securing device 200 can further include a display, such as a liquid crystal display (LCD), a light emitting diodes (LED) display and/or an audio display that generates monotones or multitones, to indicate the state and/or status information of the security device 200.

In those exemplary embodiments where an independent securing device 200 is not desired, the securing device 200 and, for example, the host controller device $250_1$, may be packaged together as a single integrated device. For example, the securing device 200 may be integrated into a cellular phone. In various exemplary embodiments, the cellular phone may be modified to include an interface such that another controller device may be used to control the securing device 200 integrated into the cellular phone.

In various exemplary embodiments, the communication between the securing device 200 and the controller device $250_1 \ldots 250_x$ is authenticated and carried out at the desired distance for the application and/or the environment at hand, and the range limitation is enforced by the nature of the communication medium chosen. Communication between the securing device 200 and the controller device $250_1 \ldots 250_x$ may be authenticated and encrypted using known cryptographic credential protocols that can support groups, such as shared secret keys, digital certificates, identity-based encryption, identity-based signatures, group signatures, credential systems with revocable anonymity which may be modified to support authentication and/or any known or future developed protocols. The credentials should usually be able to both support authentication and key exchange. Ephemeral keys may be used for key exchange as long as authentication is supported.

In various exemplary embodiments, a user uses the securing device 200 to add a device $120_1 \ldots 120_m$ to a group. As an example, the user uses the location-limited channel 206 of the securing device to "point out" the target device $120_1$. This can be performed by, for example, using an infrared beam to transmit information to the target device $120_1$, or by using a contact interface to touch the securing device 200 to the desired target device $120_1$. In any case, this indicates to the target device $120_1$ that the target device $120_1$ is to be added to the group and allows the securing device 200 and the target device $120_1$ to exchange authentication information via the location-limited channel 206. The exchange of authentication information will allow both devices to set up a secure communication over which subsequent interactions can take place, which may be an arbitrary network or communication link.

In various exemplary embodiments, during subsequent interactions, the securing device 200 sends to the target device $120_1$ a new member credential along with supporting information about the group, such as the group root certificate and current revocation information. The securing device 200 may optionally send additional information such as additional keys to be used for group communication, information about the addresses of current members of the group and so forth. The target device $120_1$ receives this information and updates its internal data storage to indicate that it is a member of this new group. The target device $120_1$ stores the group credentials, revocation information and other supporting data.

In various exemplary embodiments, the securing device 200 further maintains membership information 306 for which a device a member. The securing device 200 may also maintain owner information 308 for that group, such as, for example, by storing private group keys. In various exemplary embodiments, the securing device 200 may store as membership information 306, a list of groups of which the securing device 200 is a member including those which it is not an owner, for each of those groups, the securing device 200 may store member credentials and owner credentials. The securing device 200 may also cache a list of current members of that group and their last known addresses, and may even include information about their credentials, for example. In various exemplary embodiments, the securing device 200 may store as owner information 308, a "root" key for each group.

In various exemplary embodiments, the securing device 200 may store as membership information 306, credentials belonging to the user not associated with any group. For example, the securing device 200 may perform various protocols that allows it to act as a standard smart card, or a credential "wallet." In various exemplary embodiments, the credentials may take the form of member credentials for a particular group. As an example, if the user has a standard X.509 certificate for a managed PKI which may be required to access a computer database, the certificate and private key may be stored in the securing device 200. The securing device 200 knowing how to present credentials, will present the required credentials to the computer. In the case of a digital wallet application, the securing device 200 may have at least two roles: one where it is acting for itself, that is, storing and managing credentials for the groups that it has been used to create; and in another it is acting for its human owner. In the second role, the securing device 200 stores and carries cryptographic credentials, which are used for the benefit of the human owner. For example, the securing device 200 acts as a smart card for the human owner. In various exemplary embodiments, the controller device may have a role in the presentation of credentials. For example, the securing device may not have the correct data interface to present an airline ticket credential to a reservation kiosk, but the controller device, such as for example, a PDA may have such an interface.

In various exemplary embodiments, the securing device 200 retains audit information 309 that relates to audits, changes in status of the communication operating environment and/or membership list in a group. Such audit information 309 may be stored in the memory 300 and/or at a location separate from the securing device 200, such as in a memory 254 of the host controller device 250$_1$ or some other offboard storage location, for redundancy reasons and/or to minimize storage space required on the securing device 200. The audit information 309 may be signed to preserve its integrity, and encrypted if the audit information 309 contains sensitive information.

In various exemplary embodiments, the securing device 200 may back up the contents stored in the memory 300 to the memory of another device such, as the memory 254 of the host controller device 250$_1$. This feature allows the state of the securing device 200 and stored information in the security device 200 to be at least partially recovered if the securing device 200 is lost or damaged.

In various exemplary embodiments, the securing devices 200 may be a member of each group it creates. However, having a device being a member of more than one group may have security implications such as that device may become a conduit by which information can move across group boundaries. Therefore, in these circumstances, it may be desirable to restrict that device to one membership in a group at a time.

Figure 3:
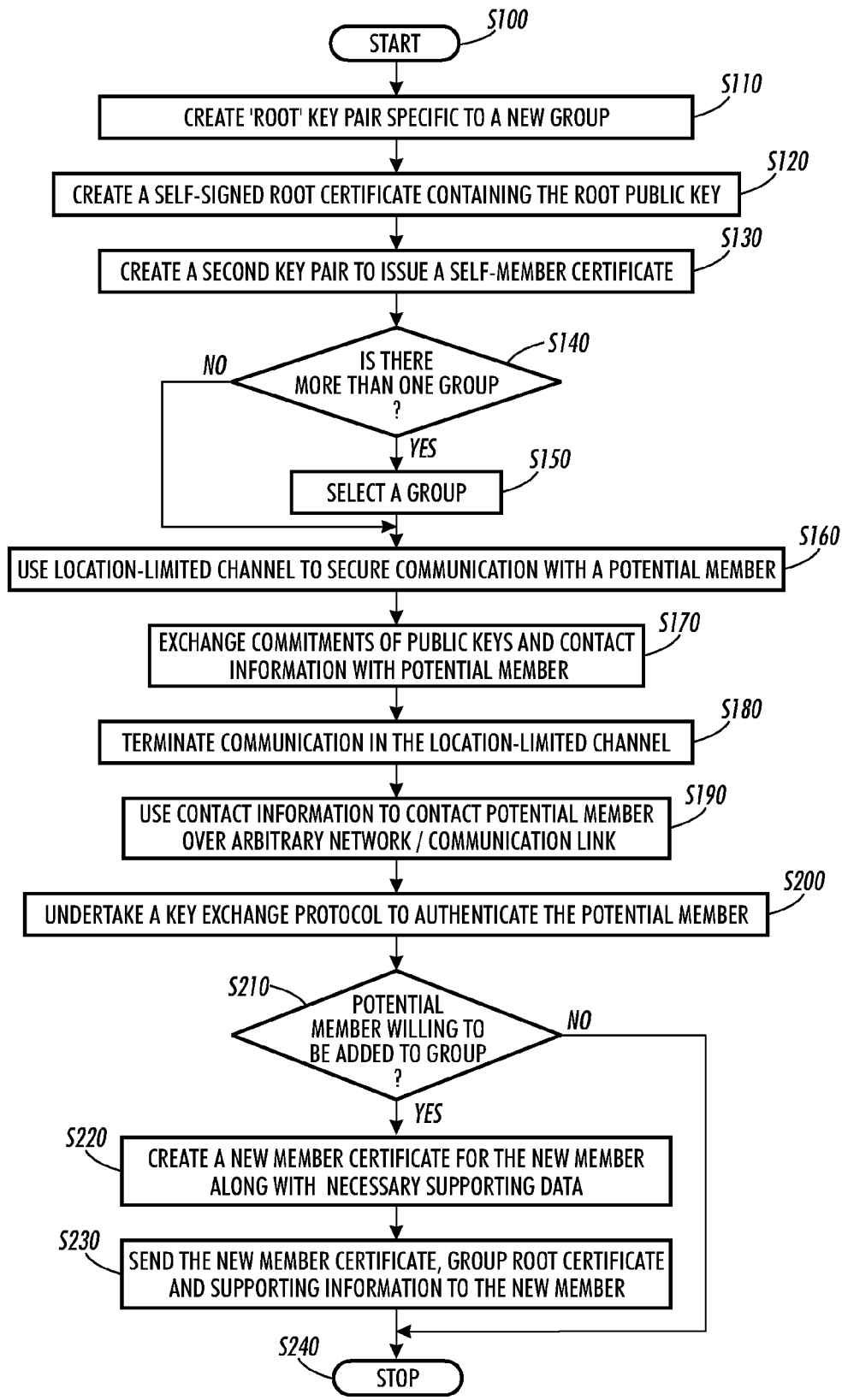
FIG. 3 is a flowchart outlining one exemplary embodiment of adding a member to a group according to this invention.

FIG. 3 is a flowchart outlining one exemplary embodiment of adding a member to a group according to the invention. As shown in FIG. 3, operation begins in step S100, and continues to step S110, where the securing device creates a new group by creating a distinguished key pair specific to the new group. This "root" key pair is used to allow the securing device to act as a Certification Authority (CA) that signs digital certificates containing the public keys of new group members. Next, in step S120, the securing device creates a self-signed root certificate containing the root public key. As an option, the self-signed root certificate may include information identifying the group, such as a friendly name. The operation continues to step S130, where the securing device creates a second key pair, if a second key pair does not exist, to be used as its member credential for the group and issues itself a member certificate. This step is performed where the root key is unsuitable for use in normal communication because the root key has special significance or properties. Stated differently, CA certificates may be different in form such as different extensions or privileges than those certificates normally used to secure network communication. The operation continues to step S140.

In step S140, when a potential member is to be added to a group, the securing device determines whether there are more than one group created. If several groups have been created, then in step S1150, a selection is made as to which group the potential member is to be added. The operation then continues to step S1160. Otherwise, if it is determined that only one group is created, than the operation continues directly to step S160. In step S160, a location-limited channel is used to establish a secure communication between the securing device and the potential member. With the secure communication established, in step S170, the securing device and the potential member exchange commitments to their public keys and contact information such as, for example, IP addresses sufficient to allow them to find each other over an arbitrary network or communication link. Next in step S180, communication between the securing device and the potential member using the location-limited channel terminates. The operation then resumes in step S190.

In step S190, the securing device uses the contact information to further communicate with the potential member using an arbitrary network or communication link. Next, in step S200, the securing device and the potential member undertake a key exchange protocol of their choice to authenticate each other by ensuring that the public keys they use match the commitments made over the location-limited channel. Then in step S210, after the securing device and the potential member have authenticated each other, the securing device signals the potential member whether it is willing to be added to the group, and whether it desires its own public key to be used in the group. If the potential member does not accept, then the operation continues to step S240 where the operation terminates. Otherwise, if the potential member accepts, the operation continues to step S220, where the securing device uses the potential member's public key to create a new member certificate for that potential member by signing its public key along with any necessary supporting information with the group root key. In the event that the potential member decides not to use its public key, then the securing device uses a public key from its own created key pair to create the new member certificate. Then, in step S230, the securing device sends to the new member the new member certificate, the group root certificate, and any necessary supporting information about the group, such as information about currently revoked devices, auxiliary keys used for securing multicast communication and so forth. In the event, the securing device has created the key pair, the securing device also sends the private key. The new member stores the received certificates and supporting information in its local memory. The new member can now establish communication with other members in the group. The operation then continues to step S240, where the communication between the securing device and the new member device terminates.

As alternative exemplary embodiments, different cryptographic mechanisms can be used as group member credentials. For example, secret keys shared between all group members are simple to implement, however they do not support distinctions between owners, such as the securing device, and group members, such as the member devices. A device becomes a member of the group when the device has access to the shared secret key. Other alternative embodiments may allow the use of anonymous credentials, or identity-based encryption or signature systems as the cryptographic credentials underlying group membership.

In various exemplary embodiments, the certificates may take many forms, including standard X.509 certificates, SPKI certificates, WTLS certificates, extended metadata language (XML) certificates, attribute certificates, or any current or future certificate types. In various exemplary embodiments, choosing certificates that comply with external constraints may be desirable. As the primary function of such a group certificate is to allow its use by a member of a group to prove membership in the group, it should contain at minimum: the member's public key, an identifier for the group that makes it unique, such as, for example a digest of the group root public key, and an optional way to uniquely identify the certificate, such as, for example a serial number signed by the group root key. The member's key may be sufficient to uniquely identify the certificate, that is the member is likely to have only one certificate for this group, and the member is likely to be the only one with that public key. In the absence of uniquely identifying information contained in the credential, the cryptographic digest of the credential may be used as its unique identifier. Optionally, certificates may contain friendly names, serial numbers, or other information designed to make it easier to manage this credential information. In various exemplary embodiments, choosing certificates that comply with external constraints may be desirable. For example, X.509 certificates can be readily used with standard SSL/TLS client and server software, or with standard IKE demons, enabling group members to secure their communications with IPSEC.

Figure 4:
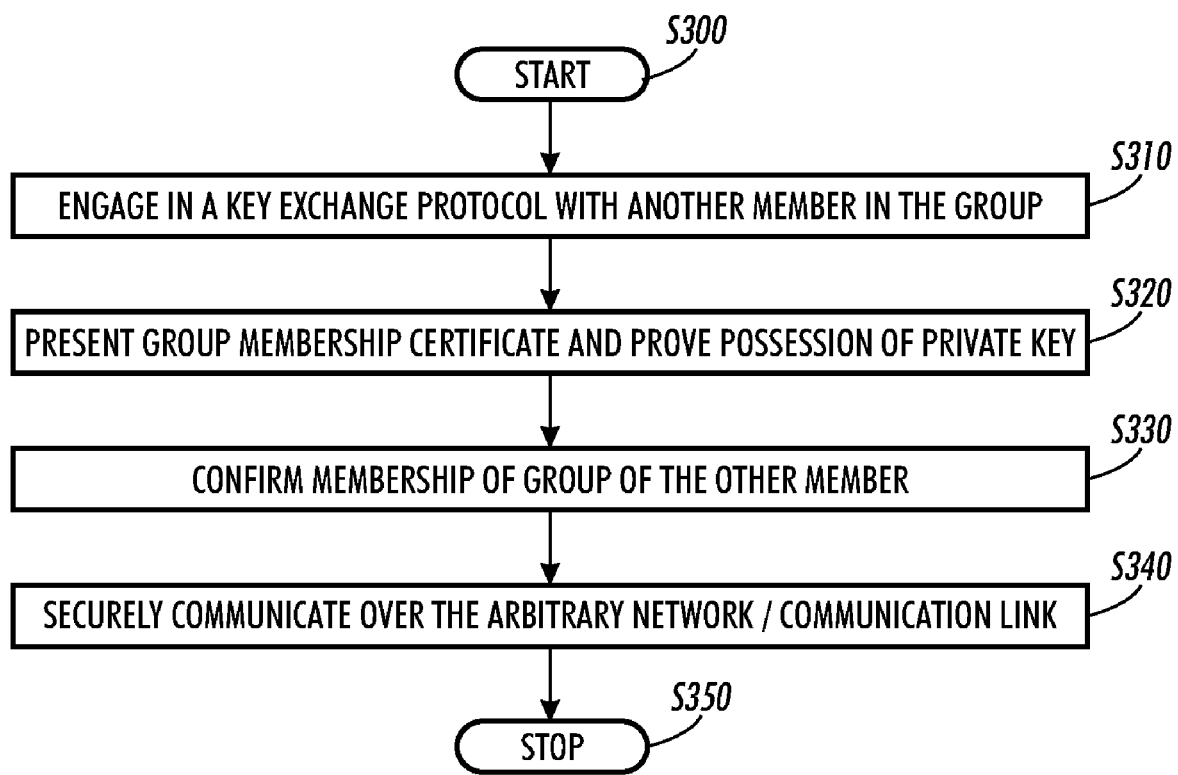
FIG. 4 is a flowchart outlining one exemplary embodiment of one member communicating with another member in a group according to this invention.

FIG. 4 is a flowchart outlining one exemplary embodiment of one member communicating with another member in a group according to the invention. As shown in FIG. 4, operation begins in step S300, and continues to step S310, where a member initiates a communication with another member by first engaging in a particular key exchange protocol over an arbitrary network or communication link, such as, for example, SSL/TLS or IKE, the protocol used to exchange keys for IPSEC communication. Then, in step S320, each member presents its group membership certificate to the other, and proves possession of the private key corresponding to the public key of the certificate. Next, in step S330, each member then confirms that the certificate so presented was for the group they expected to be communicating with, and was signed by the group root key. Next, in step S340, once the confirmation has been established, the two members securely communicate with each other over the arbitrary network or communication link. Once the communication has ended, the operation continues to step S350, where the operation terminates. In various exemplary embodiments, a member may also cache information such as identities and most recent addresses of other group members it has communicated with.

In various exemplary embodiments, members of a group may communicate using a common language such as a remote procedure call (RPC) framework, such as, for example, SOAP, Java RMI, or SUN RPC, or a specified wire protocol. The RPC framework or wire protocol is run over a channel authenticated and encrypted using credentials that identify both communicants as members of a particular group. In various exemplary embodiments, the members' firewalls can be configured manually or automatically to refuse communication from any device not in one of the groups to which this device belongs, and/or refuse communication at the level of particular protocols or ports as a function of which groups are specified as being allowed to talk. As an example, a member may be in a game group that allows all group members to recognize each other, but that member may only allow other members of that group to talk to the member using the gaming protocol and/or to the port on that member's machine on which the gaming program is listening.

Figure 5:
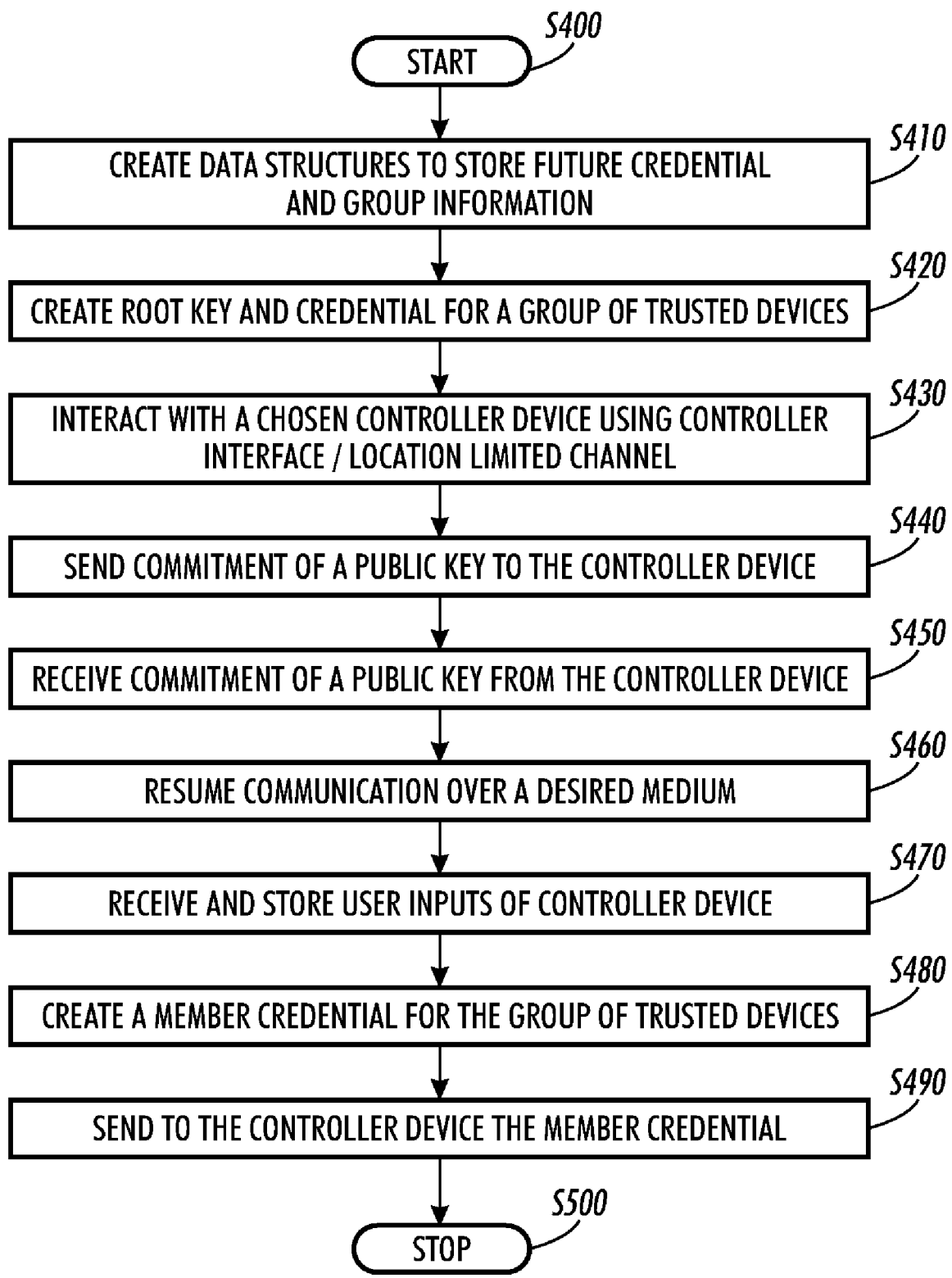
FIG. 5 is a flowchart outlining one exemplary embodiment of an initialization process of a securing device according to this invention.

FIG. 5 is a flowchart outlining one exemplary embodiment of an initialization process of a securing device according to the invention. As shown in FIG. 5, operation of the process begins in step S400, and continues to step S410, where an initialization of the securing device begins. In step S410, the securing device creates data structures to store future credential and group information. The securing device will create one or more key pairs to be used for identification. The securing device may also contain key pairs or credentials given to it by its manufacturer that cannot be erased. Then, in step S420, the securing device creates a root key and credential for a group of trusted devices. Next in step S430, the securing device interacts with a chosen controller device using a controller device interface or a location-limited channel. Next, in step S440 the securing device sends a commitment of its public key to the controller device. This is the initiation of the exchange of pre-authentication information over the location-limited channel. Next, in step S450, the controller device responds by sending a commitment of its public key to the securing device. Operation then continues to step S460, where authenticated and/or encrypted communication resumes over a desired medium which may be the controller device interface, the location-limited channel or another communication medium.

In step S470, the controller device sends to the securing device any additional user inputs which the securing device may store in its memory. The user may use a user interface provided in the controller device. For example, the user may input personalization application, a friendly name and the like. In step S480, the securing device makes a credential for the controller device as a member of its group of trusted devices, for example, by certifying a public key given to it by the controller device. Then, in step S490, the securing device sends to the controller device the new credential along with any necessary supporting group information which the controller device then stores in its memory. The new credential and any necessary supporting information will be used by the controller device for all future communication with the securing device. The operation then continues to step S500, where the process terminates.

In various exemplary embodiments, future communications between the controller device and the securing device are primary user commands to the securing device, and may require additional application code that runs on the controller device, as a user interface, in a form of an application, Java code, a web page and the like. In various exemplary embodiments, such application code may already have been installed by the controller, can be downloaded at this point, or gotten from the securing device. In various exemplary embodiments, additional controller devices may be added to the "trusted group." Such additions may be done, for example, using the operation described in FIG. 3.

Figure 6:
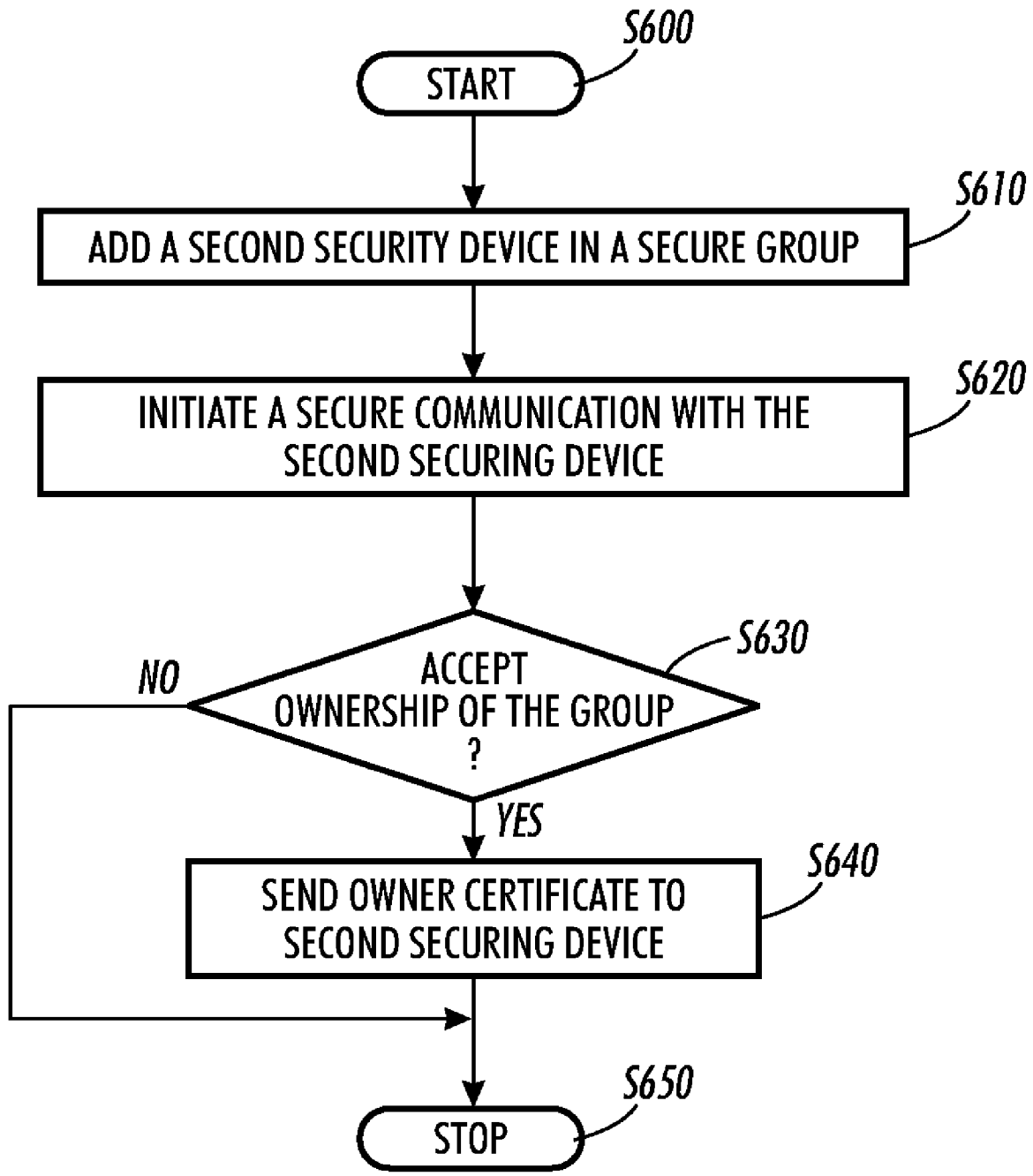
FIG. 6 is a flowchart outlining one exemplary embodiment method for adding another securing device as an additional owner to a group according to this invention.

FIG. 6 is a flowchart outlining one exemplary embodiment method for adding another securing device as an additional owner to a group. The operation begins at step S600, and continues to step S610, where a second securing device is first added to a secure group as a member using an operation, such as for example, the operation described in FIG. 3. Next, in step S620, once the second securing device is a member of the secure group, and the owner securing device has its address, the owner securing device initiates a secure communication with the second securing device. In step S630, over the secure channel, the owner securing device queries the second securing device whether it is willing to accept joint-ownership of that group. If the second device accepts ownership, the operation continues to step S640, where owner certificate for the group that may be specially indicated as such, for example, in the case of X.509 certificates, they may have the basic constraints and key usage extensions set to indicate that this is a CA certificate, is sent to the second securing device. The second securing device having received such certificate, is now considered as an owner of the group. The operation continues to step S650, where the operation terminates. If in step S630, the second securing device refuses to accept joint-ownership, the operation continues to step S650 where the operation terminates.

In the exemplary operation described above, once the original group owner has made a secure connection with the second securing device, the owner securing device will create for the second securing device a new group certificate, signed with the key it has that is certified as a CA for the group. This can be the group root certificate, or the certificate belonging to another secondary owner of the group, that indicates the second securing device is authorized to act as a CA for the group. The second device's key can be the same as the one it uses in its member credential for the group, or the second securing device can create a new key pair. When the second securing device adds a new member to the group, it provides that new member not only with the root certificate of the group, but with its own CA certificate and a chain of CA certificates connecting its certificate with the root, that is, the CA certificate of the device that signed its CA certificate, and so on, until it reaches a CA certificate signed by the root.

In various exemplary embodiments, if the first securing device adds the second device as an owner of the group by passing it a copy of the group root private key, the credentials issued by the two owners to new devices will be indistinguishable, as they will be signed by the same key. Accordingly, a mechanism should be used to ensure that member credentials are uniquely identifiable to be able to continue to work even though these owners may issue credentials to new members in parallel without communicating to one another. For example, when the second securing device is being created as another owner of the group, the creating securing device could reserve an serial number space for the new owner. However, in various exemplary embodiments, credentials identified uniquely by their cryptographic digests are immune to this, assuming the credentialing system used includes information in those credentials designed to make two certificates signed by the same key for the same key distinct, that is, by including a date of issue in the certificate.

One advantage of having all issuers carry the same root key is that revocation information can be sent around without sending the signing certificate of the particular owner that signed it; all members of the group are guaranteed to have the root key and to be able to use it to verify revocation information. Another advantage is that this approach works for all types of cryptographic credential systems, not just certificate-based ones.

In various exemplary embodiments, the second securing device may already be a member of the group. In this case, the user is given a list of devices in the group and is asked to select one of the device in the group.

Figure 7:
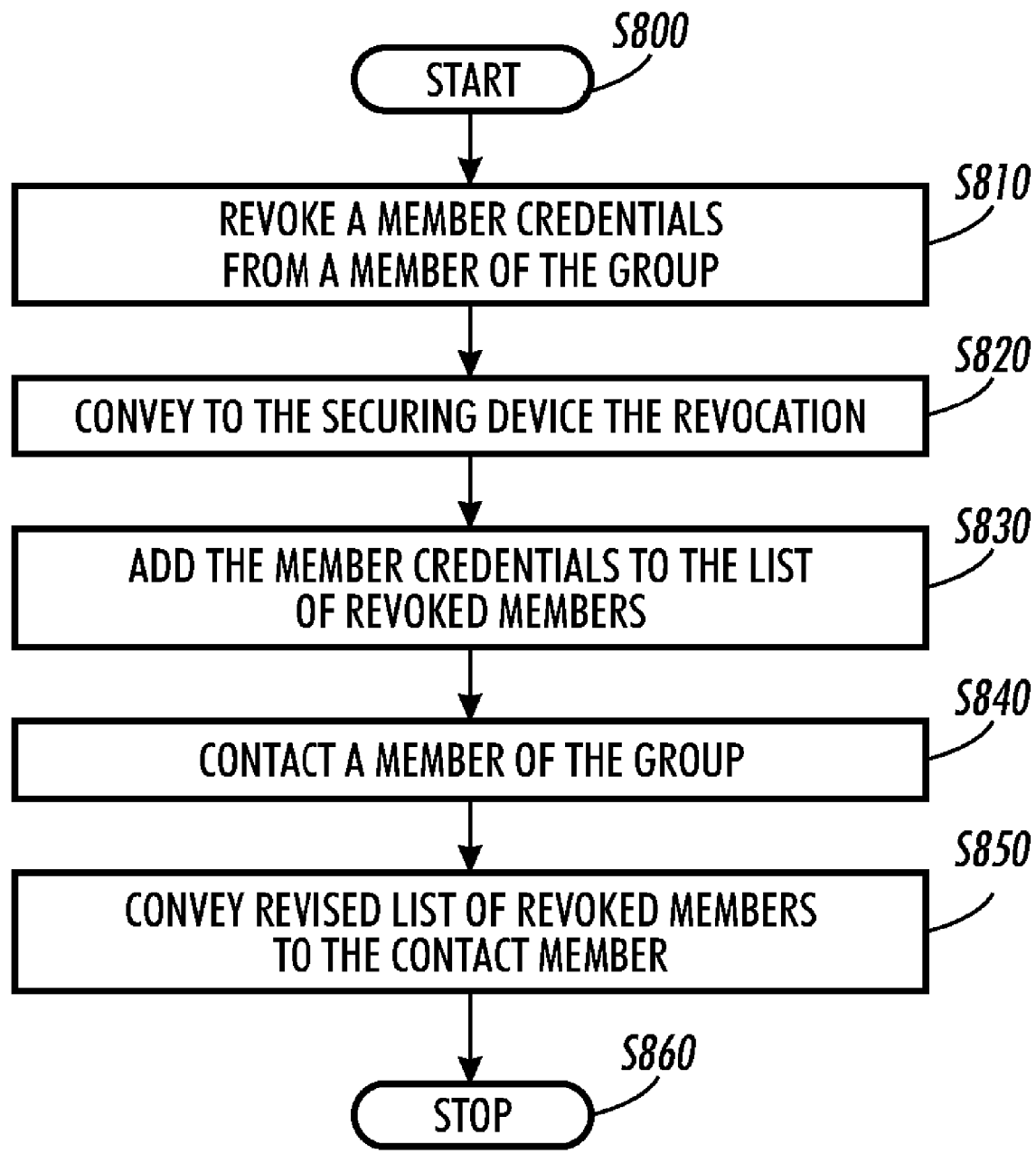
FIG. 7 is a flowchart outlining an exemplary embodiment of generating a list of revoked devices according to this invention.

FIG. 7 is a flowchart outlining one exemplary method of generating a list of revoke members according to the invention. The operation begins at step S800 and continues to step S810, where member credentials from a member of the group is revoked. Then in step S820, the revocation is conveyed to the securing device. In step S830, the securing device adds that member credentials of the revoked member to its list of revoked members. In step S840, as the securing device comes in contact with other members of the group, in step S850, a signed copy of the revised list of revoked members is communicated to the contact member. A member with the revised list of revoked members may also communicate that signed list to other members that it comes in contact with. The operation continues to step S860, where the operation terminates. Once every member in the group has been revoked, the group is said to be destroyed. In various exemplary embodiments, the securing device retains a record of the existence of the group, for auditing purposes.

Figure 8:
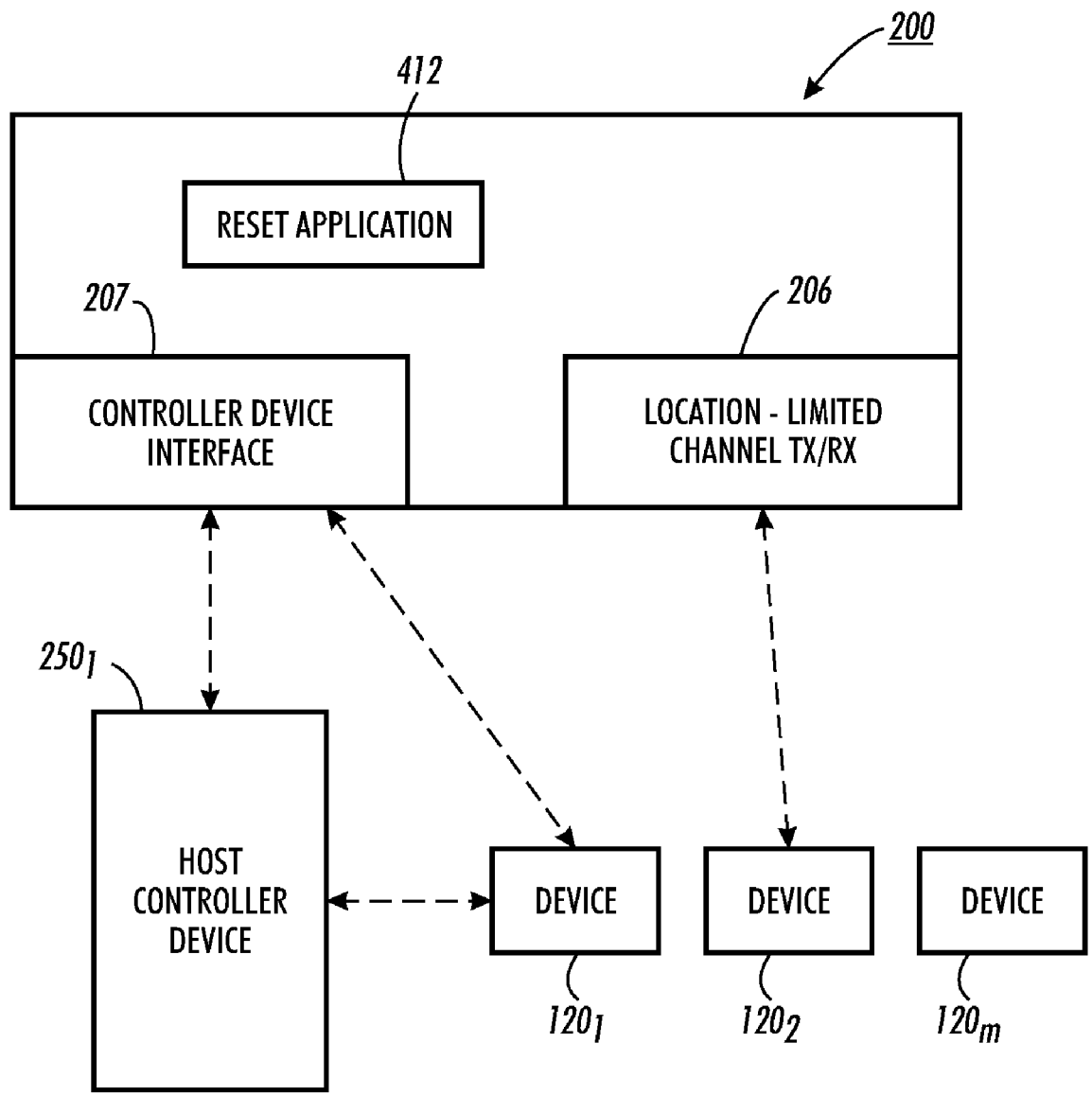
FIG. 8 illustrates one exemplary embodiment of a securing device with a reset application according to this invention.
Figure 9:
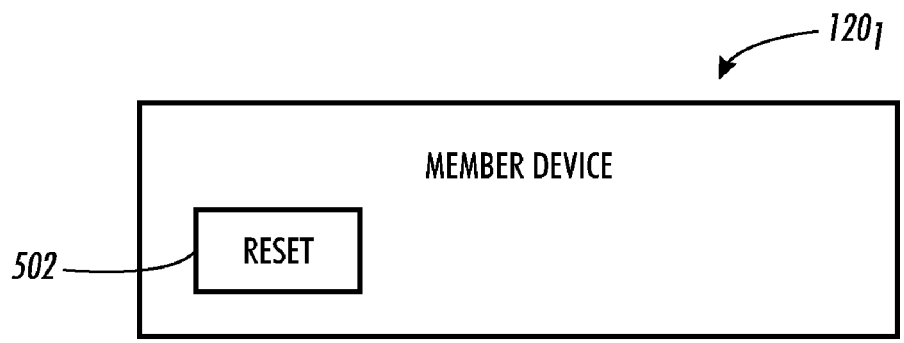
FIG. 9 illustrates one exemplary embodiment of a member device with a reset button according to this invention.
Figure 10:
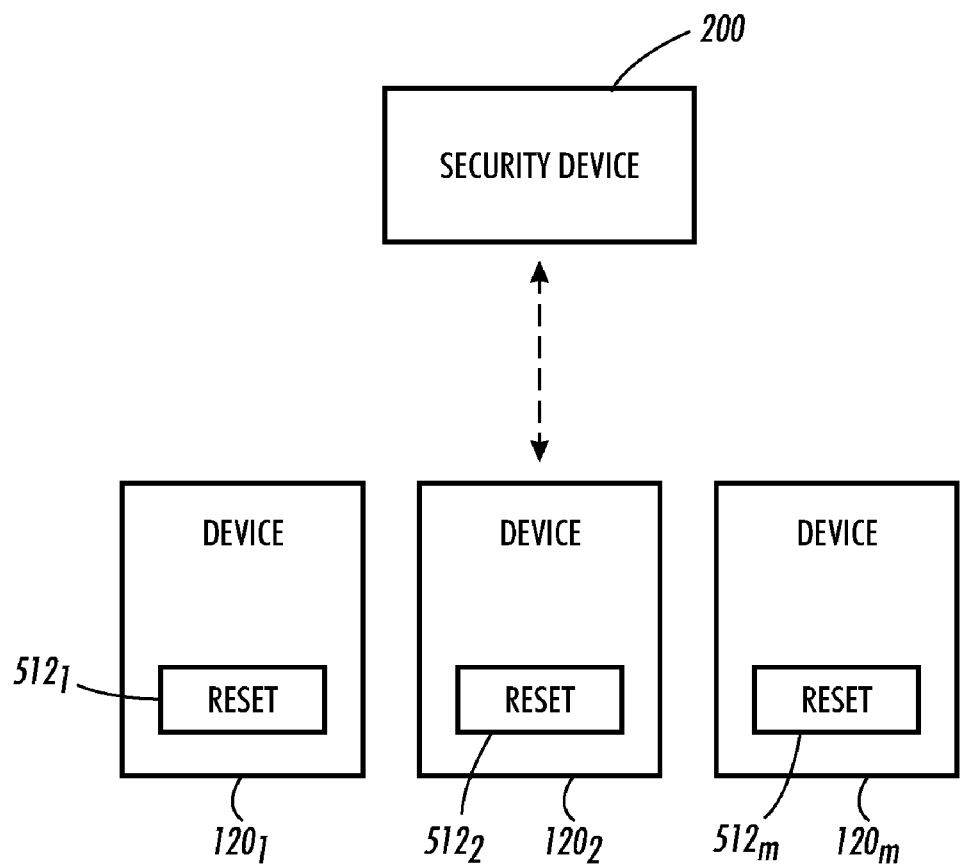
FIG. 10 illustrates one exemplary embodiment of each member devices provided with a reset according to this invention.

FIG. 8 illustrates an exemplary embodiment where a securing device 200 has a reset application 412 that is usable to reset one or more of the devices $120_1 \ldots 120_m$. The reset application 412 may be stored in the memory 300 and, when executed by the logic unit 202, causes one or more of the devices $120_1 \ldots 120_m$ that the securing device 200 controls to be reset to their initial state. FIG. 9 illustrates an exemplary embodiment where a member device $120_1$ is provided with a reset button 502 to remove information, such as member credentials, keys and/or membership lists, stored in the memory 300. Engaging the reset button 502 usually reverts the member device $120_1$ to its initial state. FIG. 10 illustrates an exemplary embodiment where each device $120_1 \ldots 120_m$ may be provided with a reset $512_1 \ldots 512_m$, which may be an application executed by a logic unit in the device $120_1 \ldots 120_m$, which, under the command of the securing device 200, the device 120 is effectively "unplugged" thereby losing its memory content with respect to communicating with the associated group. There are some circumstances where the availability of such a resetting application provides an avenue for unacceptable denial of service attacks. In those circumstances, the devices may be built with reset buttons would be operative in the presence of the securing device that created the group the devices are removing themselves from.

As described above, the apparatus and methods according to this invention allow at least two devices to securely communicate over a network medium. The apparatus and methods according to this invention allow the medium used for the location-limited channel, the public key algorithm used for the key commitments, and/or the final authenticated key exchange protocol used over the network medium to be dynamically chosen.

In various exemplary embodiments, a software framework that supports inclusion of different location-limited channel types, public key algorithms used for the key exchange protocols and the final key exchange protocols chosen, and allows these to be dynamically chosen, can be used. The framework can be extended, to provide a new location-limited channel type, or a new key exchange protocol for example, by implementing a Java™ interface to provide a small amount of syntactic "glue".

In various exemplary embodiments, a system comprises a securing device, which is the initiator of the authenticated channel, and a responding server. The server listens for a connection on both the location-limited channel and the network medium, but only admits network connections from clients who have performed authentication on the location-limited channel.

In various exemplary embodiments, the commercially-available Infra-red Data Association (IrDA) system can be used as a medium for the location-limited channel. The securing device opens an IrDA connection to the device, and generates an error if it discovers more than one potential IrDA endpoint. Across this connection, the securing device and the device exchange authentication data such as, for example, XML-encoded authentication data, containing authentication information, such as, for example, a commitment to an ephemeral Digital Signature Algorithm (DSA) public key, a "friendly name", and an IP address and a port on which the device is listening.

With the authentication complete, the IR channel is closed, and the securing device extracts the device's IP address and port number from the data it received. The securing device opens a normal SSL/TLS connection to the device using the network. Each side uses the information gained in the authentication step, i.e., the commitments to the public keys, to authenticate the newly opened channel. The securing device and device are now free to securely exchange any information they choose over the network medium.

While the invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A securing device, comprising:
   a logic unit to generate authentication information for a group; and
   a transmitter to transmit authentication information to a potential member, wherein the receipt of the authentication information by the potential member designates the potential member as a member to the group and the member uses the authentication information to secure communication with another member in the group;
   a reset application stored in a memory;
   the logic unit to generate a reset signal using the reset application; and
   the transmitter to transmit the reset signal to the member, wherein the receipt of the reset signal by the member revokes the authentication information of the member.

2. The securing device of claim 1, further comprising:
   a controller device interface to interface the securing device to at least one controller device.

3. The securing device of claim 2, wherein the controller device includes a user interface that provides communication with the securing device.

4. The securing device of claim 2, wherein the controller device interface is adapted to communicate with another device through the network medium.

5. The securing device of claim 1, wherein the securing device is integrated with a controller device.

6. The securing device of claim 1, wherein the logic unit generates a trusted group and designates a controller device as a member of the trusted group.

7. The securing device of claim 1, further comprising:
   a biometric input.

8. The securing device of claim 7, wherein the biometric input is used to generate authentication information.

9. The securing device of claim 7, wherein the biometric input is used to secure data in a memory of the securing device.

10. The securing device of claim 7, wherein the biometric input authenticates the user allowed to use the securing device.

11. The securing device of claim 1, wherein the logic unit generates audit information.

12. The securing device of claim 1, wherein the authentication information uses cryptographic credential protocol.

13. A method, comprising:
    generating a first authentication information for a group;
    sending the first authentication information to a first potential member through a communication medium, wherein the receipt of the first authentication information by the first potential member designates the first potential member as a member of the group
    providing a reset application stored in a memory;
    generating a reset signal using the reset application; and
    transmitting the reset signal to the member through the communication medium, wherein the receipt of the reset signal by the member revokes the authentication information of the member.

14. The method of claim 13, further comprising:
    communicating a pre-authentication information to the first potential member using the location limited channel.

15. The method of claim 13, further comprising:
    generating a plurality of groups; and
    selecting the group from the plurality of groups to which the first potential member is to be added.

16. The method of claim 13, further comprising:
    communicating with another member of the group through the communication medium using the first authentication information to secure the communication.

17. The method of claim 13, further comprising:
    generating a second authentication information for a trusted group;
    sending the second authentication information to a second potential member, wherein the receipt of the second authentication information by the second potential member designates the potential member as a member of the trusted group.

18. The method of claim 13, further comprising:
    initiating a secure communication with a third member;
    sending ownership information to the third member, wherein the receipt of the ownership information by the third member designates the third member as a co-owner of the group.

19. The method of claim 13, further comprising:
    revoking authentication information from a fourth member;
    adding the revoked authentication information of the fourth member in a list of revoked members; and
    conveying the list of revoked members to other members of the group.

* * * * *